(12) United States Patent
Rush et al.

US008022019B2

(10) Patent No.: US 8,022,019 B2
(45) Date of Patent: Sep. 20, 2011

(54) METHOD OF MAKING PROPPANT USED IN GAS OR OIL EXTRACTION

(75) Inventors: David John Rush, Denton, TX (US); Juan Leal Gonzalez, Nuevo Leon (MX)

(73) Assignee: Unimin Corporation, New Canaan, CT (US)

( * ) Notice: Subject to any disclaimer, the term of this patent is extended or adjusted under 35 U.S.C. 154(b) by 34 days.

(21) Appl. No.: 12/622,900

(22) Filed: Nov. 20, 2009

(65) Prior Publication Data

US 2010/0197532 A1      Aug. 5, 2010

Related U.S. Application Data

(60) Provisional application No. 61/148,428, filed on Jan. 30, 2009.

(51) Int. Cl.
*C09K 8/62* (2006.01)
*B02C 1/00* (2006.01)
(52) U.S. Cl. ............. 507/269; 241/3; 241/15; 241/24.1
(58) Field of Classification Search .................. 507/269; 241/3, 15, 24.1
See application file for complete search history.

(56) References Cited

U.S. PATENT DOCUMENTS

| 2,813,318 | A | 11/1957 | Horth |
| 4,050,637 | A | 9/1977 | Eirich et al. |
| 5,334,364 | A | 8/1994 | Aguirre-Villafana et al. |
| 2007/0114029 | A1 | 5/2007 | Kazi |

OTHER PUBLICATIONS

EIRICH Intensive Mixer (8 pages), Maschinenfabrik Gustav Eirich GmbH & Co. KG, Apr. 2003.
Choosing Fracturing Sand to Optimize Permeability Achieved vs Cost, Article by Halliburton relating to frac sand, Copyright 2005.
Wisconsin's diamonds: Frac Sand, Article by Journal Sentinel Inc., Copyright 2005-2007.
Base Sand Reclamation, Article by M.J. Granlund, National Engineering Company, Chicago, Illinois, Published by American Foundry Society, pp. 177-198.
The Simpson Pro-Claim is Simple and Effective, Technical Data and Drawing, Simpson Technologies, Aurora, Illinois (2 pages).

*Primary Examiner* — Timothy J. Kugel
(74) *Attorney, Agent, or Firm* — Rankin, Hill & Clark LLP (57) ABSTRACT

Method and system for making a spherical proppant having a selected grade from a naturally occurring mined mineral having a hardness of over 6.0 Mohs. The method and system involves preprocessing the mineral mechanically into a semi-dry feedstock comprising a mass of particles with initial sphericity values generally less than 0.60; subjecting the semi-dry feedstock to an aggressive abrasive attrition operation for a process time; and, controlling the process time to a value wherein the particles of the feedstock are converted to final processed particles having a sphericity greater than 0.60 by increasing the sphericity of the feedstock particles by at least 0.10. In addition, the processed particles are screened to obtain a proppant having a selected grade.

22 Claims, 9 Drawing Sheets

METHOD OF MAKING PROPPANT USED IN GAS OR OIL EXTRACTION

This application claims the benefit of prior provisional application (UMEE 200113 P) Ser. No. 61/148,428 filed Jan. 30, 2009. This prior copending application is incorporated by reference herein, as if duplicated in this application. The invention relates to the art of processing naturally occurring minerals and preferably to processing silica sand. More particularly, the invention is directed to a novel method of making a proppant from natural occurring silica sand, which proppant is referred to as "frac sand." Proppants are large spherical particles normally having selected grades with a maximum size of 6-35 mesh and a minimum size of 30-140 mesh.

BACKGROUND

A proppant is granular mass forced under pressure into fissures in the extraction cavity of a gas or oil well. The proppant must be able to maintain exit flow to the outlet of a gas or oil extraction bore; therefore, it requires large particles having a relatively uniform, higher spherical shape. It must have the ability to absorb a crushing force often exceeding 4,000 psi. Only a certain limited number of silica sand deposits provide sand having a high degree of roundness and a high degree of sphericity, as well as crushing resistance. Consequently, only sand from the specific mines or areas are acceptable as a frac sand proppant for oil or gas extraction. With the present demand for claiming more oil and gas from an extraction bore, such natural frac sand is now becoming in short supply. It commands a very high price on the open market. Such special sand has an inherent high roundness and high sphericity. The roundness characteristic measures the curvature of the individual sand particles. Sphericity compares the particles to a perfect sphere. This sphericity value for frac sand is greater than 0.60, where 1.00 is perfection. Such naturally occurring "frac" sand forms the background and objective of the present invention, although the invention has been used for processing other hard minerals into an acceptable proppant. The hard naturally occurring minerals are those minerals having a hardness on the Mohs scale of over 6.0. It is very important for the frac sand industry to have a product that resist high pressures without breaking apart the sand grains, as well as to have enough sphericity and roundness to leave adequate voids to allow oil to flow between the voids. This is referred to as permeability. Angular grains, as well as grains with fractures and grains that are weaker than the quartz, are detrimental. Indeed, they are unacceptable. Such grains when submitted to high pressures break apart and generate fine particles that block the voids impending the flow of natural gas or oil from the well.

THE INVENTION

The invention is a method and system that produces a satisfactory proppant or frac sand from common silica sand by using a high abrasive attrition device to process a feedstock in a semi-dry state. Semi-dry is a moisture content in the general range of 5-20 percent. This device intensifies the rubbing between sand particles in the semi-dry mass so the small material abraded from the irregular surface of the particles can be separated by a washing process. Washing of the processed mass removes fines to improve the quality of the final product, which final product has been converted from a common sand particle to a particle having an improved sphericity and roundness. This novel process for converting a common silica sand into a proppant material employs an abrasive attrition device operated at a high speed. In the preferred embodiment the attrition device is an inclined rotating mixing container that tumbles a silica sand feedstock while it forces the feedstock into a path of a rotor tool driven in the opposite rotary direction than the mixing pan or container. This device includes a deflector that removes material from the cylindrical inner wall of the container and deflects the particles into the path of the high speed rotor. Such mechanical action provides intensive abrading and homogenization of the feedstock particles. The rotor includes outwardly extending beater blades that mechanically causes the individual particles being tumbled by the container to become more round and having an increased sphericity. The bottom beater blades prevent build up of the bottom wall of the inclined container, as it is rotated. Adjacent bottom wall of the container highly compressed particles are tumbled and forced against each other by the weight of the material in the rotating container or pan. This abrasive attrition process performed by the device is continued until the individual particles of the incoming feedstock are rounded to the desired degree, which results in a sphericity and/or roundness exceeding about 0.7 to 0.8.

The preferred embodiment of the present invention relates to a method and system for converting somewhat ordinary, naturally occurring silica sand having a roundness and/or sphericity as low as about 0.40 into a frac sand having a roundness and sphericity greater than 0.60 and preferably greater than 0.70. The sand to be converted does not have a high degree of roundness or sphericity and often does not have the crush resistance necessary for use as frac sand. The classification "round" is used in the art and does not mean that the sand particles have a high roundness or a high sphericity. The preferred embodiment of the invention involves the method and system for converting such common silica sand into an acceptable frac sand and a frac sand having a selected grade. The invention has been determined to be more universal in its application in that other hard materials can be used as the particulate feedstock. The intended scope of the invention is defined in the attached "claims." There has been a constructive reduction to practice of these claimed concepts, as schematically set forth in the attached drawings and as hereinafter disclosed.

The primary aspect of the invention is the discovery of a method for making frac sand having a selected grade from naturally mined, silica sand having measured values of roundness and/or sphericity substantially less than about 0.60. This discovered, novel method involves processing the mined silica sand into a semi-dry feedstock with particles having a roundness and/or sphericity not much greater than the measured value and vigorously agitating the many particles in grain to grain contact, while the particles are traveling in a first forced path, preferably a circular path. Then the moving particles are driven back or propelled in the same path but in an opposite direction. Such action causes the particles to collide as they travel in opposite directions in the confined same area. The particles are carried in a circular path and propelled backwardly into that same path to cause a physical phenomenon defined as "abrasive attrition." Abrasive attrition is moving particles in a first direction or in a first path and then intercepting and propelling these particles in an opposite path so that the abrasive interaction between particle surfaces causes abrasion of surface irregularities. This physical phenomenon converts the particles of the semi-dry feedstock into more round and spherical particles of the final product. The moving particles are intercepted and propelled backward by a fast moving flat member called a "beater blade." This interaction between particles does not fracture the particles, but abrades the surfaces by sliding particles over particles or over the fast moving member. These particles are then useful as a proppant. They are individual, large spherical particles with a high crushing resistance.

In accordance with a preferred embodiment, the incoming feedstock is a mass of large particles formed from mined silica sand. The relative size of the feedstock particles may be changed to match the desired, selected grade of the frac sand. This is an alternative. The method produces a spherical sand from the particles of the feedstock. The processed sand has an improved roundness and sphericity while also having crush strength as necessary for a proppant. In accordance with the broadest aspect of the invention, the semi-dry feedstock is formed from a naturally occurring mined mineral having a hardness of over 6.0 Mohs.

In accordance with the invention, there is provided a method of making a spherical proppant having a selected grade and improved crush resistance or strength from a naturally occurring mined mineral having a hardness of over 6.0 Mohs. This method comprises forming the mineral into a feedstock comprising a mass of particles with initial spherical values generally less than about 0.60. The preprocessed feedstock is then subject to abrasive attrition for a selected process time Abrasive attrition has been defined as moving particles in one path and propelling particles back through that same path by a moving beater blade to remove surface material from the particles to improve their roundness and sphericity. The selected process time is controlled to a value where the particles of the feedstock are converted into processed particles having a sphericity greater than 0.60. This is accomplished by increasing the sphericity of the feedstock particles by at least 0.10. This minor amount of improvement in sphericity is a drastic improvement in the particles and their ability to act as a proppant.

In accordance with another aspect of the invention, the final processed particles are washed to remove fines and then dried and screened to obtain a spherical proppant having a desired selected grade.

When the naturally occurring mined mineral is silica sand, the resulting proppant is a frac sand. The initial spherical values are often less than about 0.40 and the sphericity of the processed particles is generally greater than 0.60. Preferably, the processed frac sand has a sphericity in the general range of 0.75 to 0.90.

This novel method of the invention drastically reduces the turbidity of the particles. Abrasive attrition of the semi-dry feedstock can be performed without measuring the end result; however, in the preferred embodiment of the invention, the particles are measured for sphericity and the selected process time of the batch operation is then adjusted to the desired time for converting the sphericity of the incoming feedstock particles to the desired sphericity for use as a proppant.

In accordance with another aspect of the present invention, the screening of the processed particles that is used to obtain a proppant having the desired selected grade involves the use of a screening network having two screens where the maximum screen size of the first screen is in the range of 6-35 mesh and the minimum screen size of the second screen is in the range of about 30-140 mesh. Thus, the selected grade of proppant is the material or product defined by processed feedstock particles passing through the maximum screen and not through the minimum screen. Each customer defines the "selected" grade. Preferably, the incoming feedstock has an $SiO_2$ content of at least 80% and a general particle shape classified as being between round and angular and with a particle size of less than about 8.0 mm. Indeed, the feedstock has a particle size coarser than about 300 mesh. The upper limit on the particle size of the feedstock may be adjusted to help in the production of a given size or grade of frac sand. The controlled selected time for subjecting the incoming feedstock to an high speed abrasive attrition action is, in accordance with the preferred embodiment of the present invention, greater than about 12 hours.

In accordance with a completely different aspect of the present invention, there is provided a system for making a spherical proppant having a selected grade and a sphericity of over 0.60 from a naturally occurring mined mineral having a hardness over 6.0 Mohs, such as silica sand. The system comprises a device or combination of devices for converting the mineral into a semi-dry feedstock having a mass of particles with an initial sphericity value generally less than 0.60. An abrasive attrition device is provided for processing the semi-dry feedstock for a process time in a batch process. This time may be set by a timer. A device for washing the processed feedstock and drying the washed feedstock is placed in advance of a screening network for selecting processed feedstock having the selected grade. The abrasive attrition device comprises a flat bottom or wall of the cylindrical container rotated in a first direction about a first axis and having a given diameter. A rotor rotates in an opposite direction about a second axis generally parallel to the first axis and spaced from the first axis. The rotor has a shaft with a lower end spaced slightly from the bottom of the container and has a first set of beater blades extending radially outwardly from the shaft adjacent to the lower end of the container. Several radially extending blades are positioned above the first set of blades and within a given distance from the lower wall of the container. The parallel axes are inclined at an acute angle in the direction from the first axis to the second axis. As the container rotates in one direction, the beater blades of the rotor rotate in the opposite direction. This action causes a tumbling of the feedstock particles as well as abrasive attrition of the particles wherein the particles are moved in opposite directions for bombardment and scraping against each other to remove uneven portions of the surface of the individual particles. This increases the particle sphericity and roundness. To increase pressure exerted on the tumbling particles adjacent the lower wall of the rotating container, the container is filled with at least 70% of feedstock. Consequently, the weight on the individual particles in the feedstock compress the particles together thereby enhancing the abrasive action of the tumbling and oppositely moving particles. The speed of the beater blades is such that their outer tips move at a linear speed of over 20 meters per second. Such speed is drastically greater than the blade speed of abrasive attrition devices now used in practicing the preferred embodiment of the present invention. Consequently, the system employs a tilted container filled with feedstock to thereby compress the feedstock for enhancing the abrasive action caused by tumbling in a tilted container. By increasing the speed of the rotating beater blades, the abrasive attrition action is intensified to accomplish the novel process. These two actions combine to cause the sphericity and roundness of the individual feedstock particles to be increased. Continuing the action ultimately results in the sphericity and/or roundness of the particles to be greater than 0.60 and preferably greater than 0.70. Indeed, the preferred implementation of the invention involves the action of the abrasive attrition device for a period of time to enhance the sphericity and roundness of the individual particles to greater than 0.6, and preferably greater than 0.8. Thereafter, the particles are graded to a size greater than about 30-50 mesh. This produces a frac sand having the characteristics of natural frac sand found only in limited mines throughout the world.

In accordance with another aspect of the present invention, the abrasive attrition device has a fixed deflector above the bottom wall of the rotating container. By curving the deflector inwardly around the rotating beater blades the fixed deflector forces the mass of feedstock adjacent the bottom wall of the container into the action diameter of the lower set of beater blades. The two parallel axes of the abrasive attrition device are inclined toward the second axis. Consequently, the feedstock is forced by gravity into the action diameter of tips of the beater blades in several vertically spaced sets to enhance the attrition action of the device. To increase the pressure on the particles in the container, the container is filled to at least about 70% feedstock.

As mentioned before, the beater blades have an outer tip speed of greater than about 20 meters per second and preferably in the general range of 20-30 meters per second. This is a relatively high speed and causes the beater blades themselves to remove material from the outer surface of the individual particles. Such action causes dust or fines that is easy removed by washing the abraded particles constituting the final product.

The primary object of the present invention is the provision of a method and system for converting somewhat common silica sand into a frac sand using an abrasive attrition device operated on a semi-dry feedstock.

In accordance with another aspect of the present invention the abrasive attrition device is operated at a high speed defined by the velocity of one movable member through a mass of particles moved in the opposite direction under compressive forces in a rotating container.

These and other objects and advantages will become apparent from the following description taken together with the accompanying drawings.

GENERAL DESCRIPTION OF THE INVENTION

Figure 1:
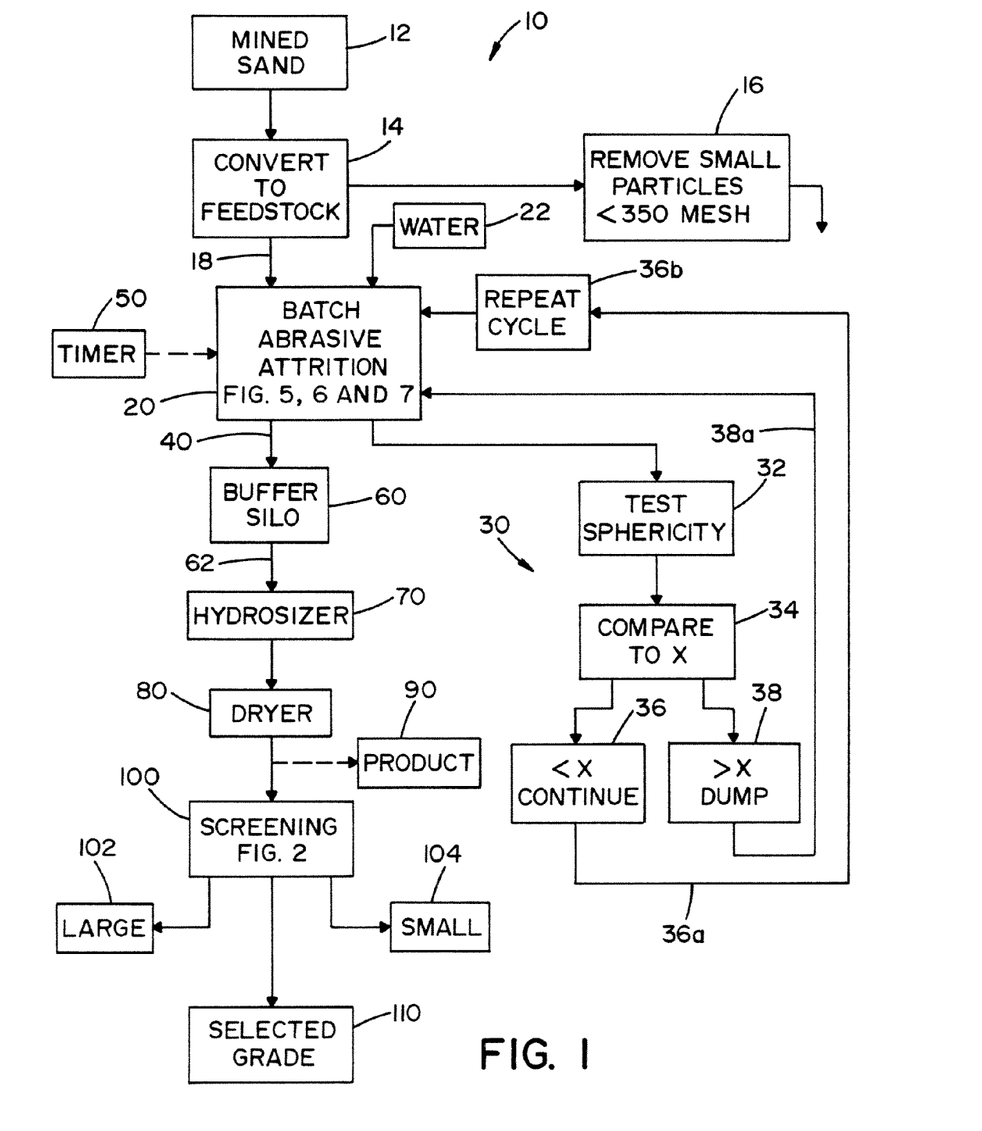
FIG. 1 is a block diagram illustrating the method for converting a mined silica sand into a proppant with the desired grade for each individual particle of the proppant.

The invention involves the concept of making frac sand from a somewhat common, naturally occurring silica sand feedstock with a diverse particle shape and particle size by "abrasive attrition." The individual particles of the feedstock are converted into a frac sand. This general process is illustrated in FIG. 1 wherein the mined sand is converted to a particle feedstock which is semi-dry and this feedstock is subjected to batch abrasive attrition by the device illustrated in FIGS. 5-7. Then the particles from the wet abrasive attrition are introduced into a hydrosizer to remove fines and are then dried before being screened into the desired frac sand grade. In one alternative, after the particles are processed for a set time, they are measured to test the sphericity. If the measured sphericity is in the desired range, the abrasive attrition process is stopped and the processed particles are passed through the subsequent process steps as shown in FIG. 1. If the measurement of particle sphericity shows that the particles do not have the desired sphericity, the batch process is repeated. This processing procedure is performed on the feedstock until the individual particles have an increased roundness and/or sphericity which is drastically improved from the initial roundness and sphericity by a substantial amount, such as 0.10 up to 0.40. Indeed, an improvement of 0.10 is drastic. Consequently, process conversion from 0.70 to 0.80 is significant. The abrasive attrition of the particles colliding with each other by movement in one path and propelled by a movable member in an opposed path is continued until the roundness and sphericity of the individual particles, as measured in the laboratory, approaches desired values greater than 0.60 and preferably greater than 0.70. Abrasive attrition included particle-to-particle collision and collision of the moving particles with a metal member movable through the mass of feedstock particles, as illustrated in FIGS. 8, 8A, 8B and 8C. The particles are propelled in the paths shown in FIGS. 10 and 11.

A sample of the finished product is given a crush test. This test is standard for proppants and involves crushing a mass of particles in the final product with a given forcer, such as 4,000-10,000 psi. The amount of "fines" produced by the particle crushing procedure is measured. As an example, if less than 10% of fines are produced the test is successful. A 5 k proppant is one where 5 k psi crushing results in less than 10% fines through the small or grading screen. Thus, successful crush test results is when less than 10% fines dropping through the minimum screen at a given crush force. The test pressure is a specification assigned to the frac sand grade by the ultimate consumer and, thus, is used by the proppant supplier for the crush test of the final product.

Figure 2:
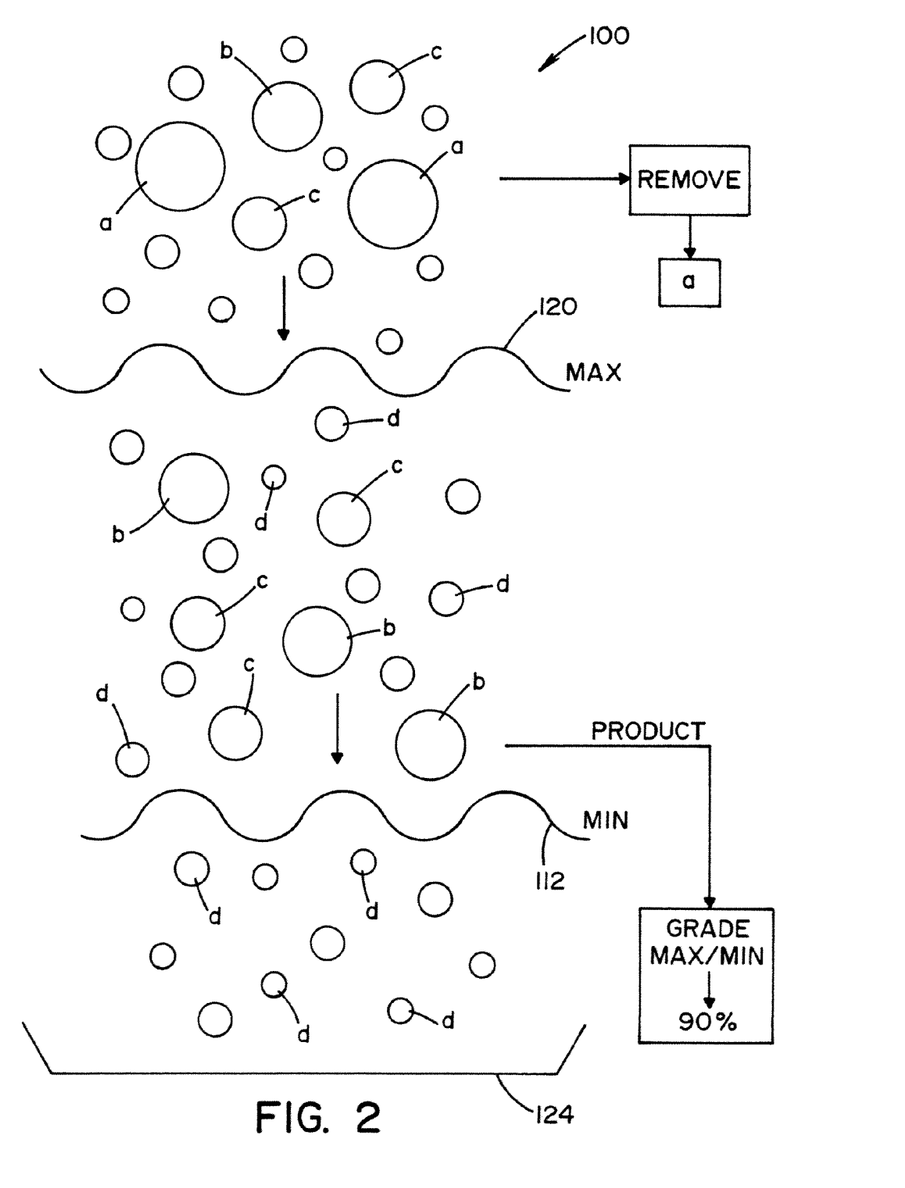
FIG. 2 is a schematic view of the screening network used for grading the proppant created by the method illustrated in FIG. 1.

Frac sand is sold with a particular or selected grade. Grade indicates the maximum particle size and the minimum particle size of 90% of the particles in the frac sand. In practice, the grade has a maximum value of 6-35 mesh and a minimum value of 30-140 mesh. The grade of the material is commonly obtained by the schematically illustrated dual screen procedure in a screening network shown in FIG. 2. In the method of the present invention, the processed sand is directed through a maximum size screen, which holds back larger particles. The rest of the processed sand passing the upper larger screen falls toward a lower, smaller screen, referred to as the minimum screen. The minimum screen removes the smaller particles that fall into a pan. Thus, the processed sand with a "selected" grade is the material removed from between the two selected screens of the screening network. This concept is well known in the proppant technology and is schematically illustrated in FIG. 2.

Figure 3:
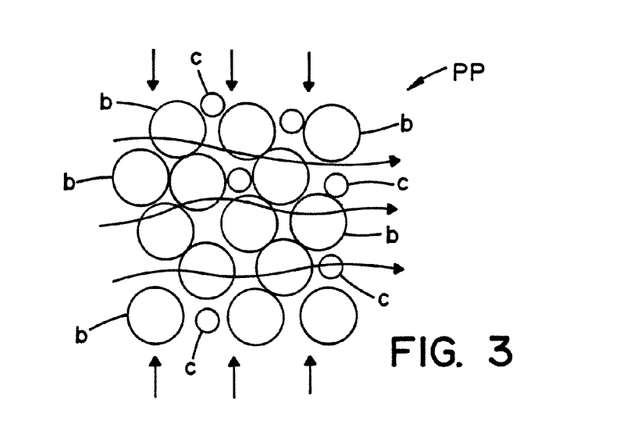
FIG. 3 is a schematic view of a proppant pack illustrating the concept of permeability through the pack when high pressure is exerted.

In FIG. 3, a packed mass of frac sand particles is schematically represented. In a fissure opened by an explosion, the pressure can approach several thousand psi. The proppant particles have a high roundness and a high sphericity. Thus, even though the mass is compressed by high pressure exerted on the fissure, oil and gas can pass through the packed frac sand to extract oil and gas otherwise generally unavailable from the oil and gas well. Thus, the concept of using frac sand for a proppant pack is illustrated in FIG. 3.

Figure 4:
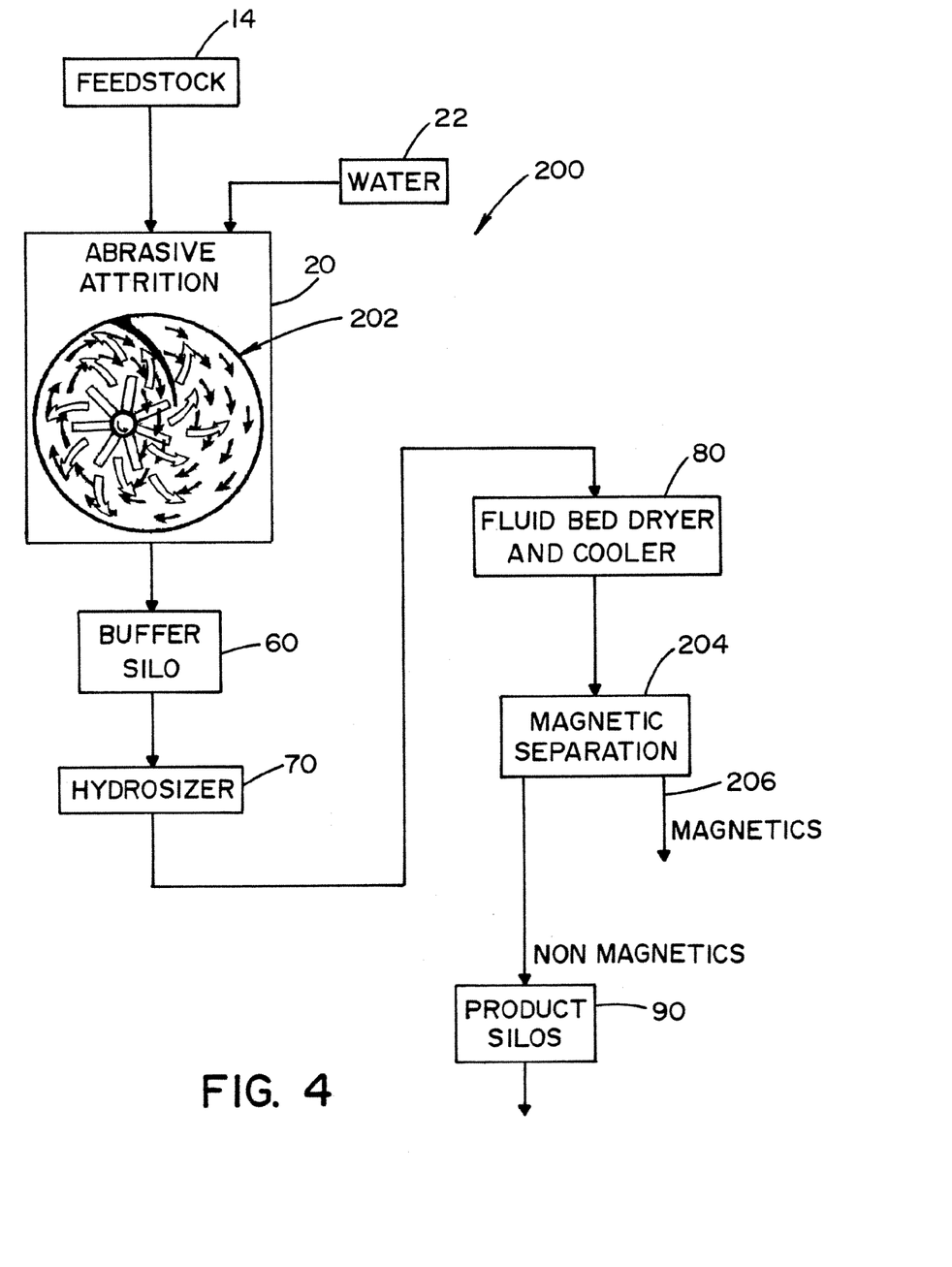
FIG. 4 is a schematic representation of the system used in practicing the method of FIG. 1.
Figure 5:
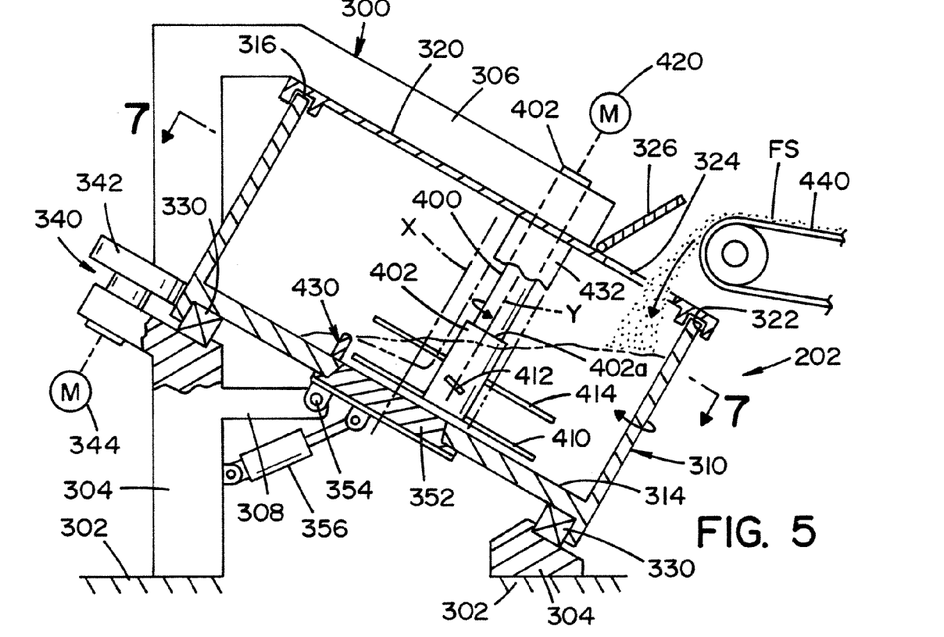
FIGS. 5 and 6 are cross-sectional views of the abrasive attrition device used in the preferred embodiment of the present invention.
Figure 6:
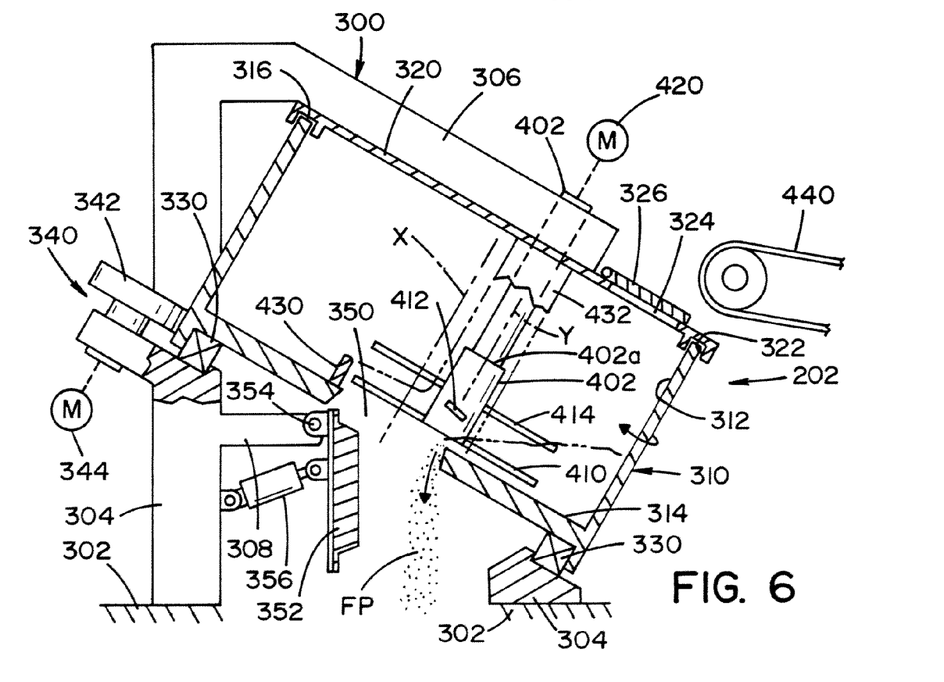
Figure 7:
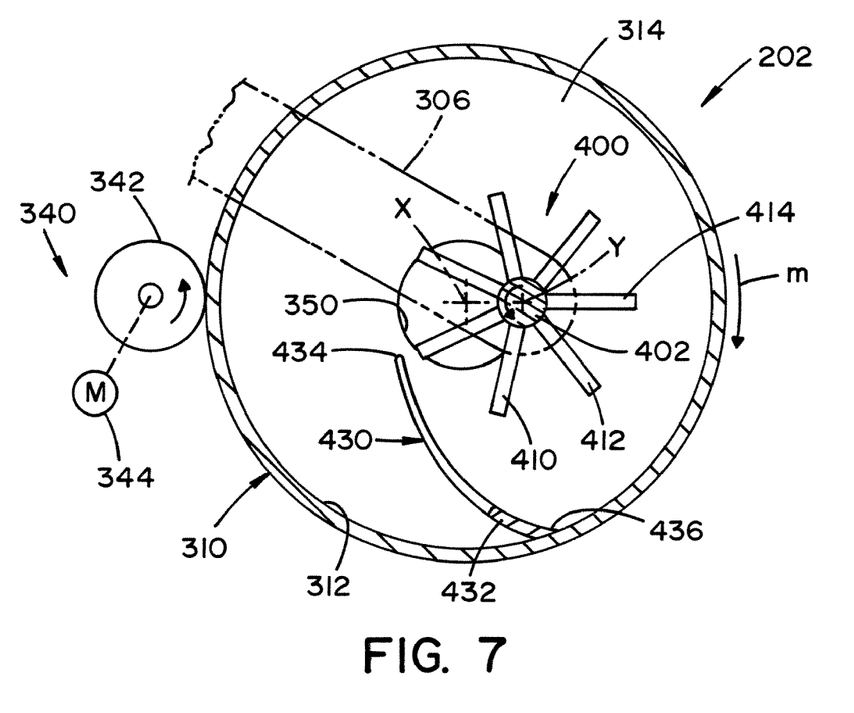
FIG. 7 is a cross-sectional view taken generally along line 7-7 of FIG. 5.

The system of practicing the present invention is schematically illustrated in FIG. 4 which involves slight modifications of the method, shown in FIG. 1. FIG. 1 is presented only for the purpose of showing a general method and some alternative process of the present invention. In FIG. 4, the feedstock is particles of a hard mined mineral, preferably silica sand. The feedstock mass of particles is loaded into the abrasive attrition device, which is schematically illustrated in FIGS. 5-7 for movement as illustrated in FIGS. 8A, 8B, 8C, 9A, 10 and 11. The device used is a mixer sold by Eirich Company as generally disclosed in U.S. Pat. No. 5,334,364. This patent is incorporated by reference herein. Conversion of a mixer on the market to perform the novel "abrasive attrition" for the feedstock particles is a use of the "mixer" not heretofore anticipated or suggested. This existing mixer is modified to increase the speed of the rotor as explained herein.

Preferred Embodiment

Referring now to the drawings wherein the showings are for the purpose of illustrating the preferred embodiment only and not for the purpose of limiting same, FIG. 1 shows the preferred method for converting common mined silica sand into an acceptable graded frac sand. Method 10 involves transporting mined silica sand with at least 80% silica dioxide to the processing site as indicated by hopper 12. The mined sand is silica sand which includes silica in particle form having a hardness of over 6.0 Mohs. From the hopper 12 the mined sand is directed to processing operation 14 which involves equipment to convert the incoming mined silica sand into a feedstock having a coarse particle size of less than about 5-10 mesh. The mined mineral is mechanically divided into individual particles. Small particles are removed, as indicated by operation 16. The removed small particles are less than about 350 mesh. Thus, the feedstock has particles in the general range of 350 mesh to the desired coarse amount determined by the desired grade of the resulting frac sand. However, this feedstock normally has individual silica particles less than about 5-10 mesh. Screens can remove larger or smaller particles if this is wanted to give the desired grade size. The processing operation divides the particles into individual grains with the small particles removed so that each particle can be processed into a desired individual particles for a proppant application. The silica sand feedstock has a particle size greater than about 50-60 microns and less than about 5-10 mesh. The converted feedstock is directed throughout outlet 18 to batch abrasive attrition operation 20 performed by a device best shown in FIGS. 5, 6 and 7. This device is operated at a higher rotary speed than the speed for which it was designed. The device performs the method operation 20. Operation 20 uses a somewhat standard abrasive attrition device that is designed to operate on a slurry normally for mixing or blending. In the attrition device at operation 20, water is added by operation 22 to make the feedstock semi-dry. The processed material has about 5-20% by weight water. This moisture content assists in the use of the device of FIGS. 5-7 for performing the desired operation 20 on a semi-dry feedstock which has not heretofore been done. Operation 20 is a batch continued for a "process time", which time is controlled by network 30. The time caused the device used in operation 20 to change the sphericity of particles in the semi-dry feedstock. This network tests the sphericity and/or roundness of the material being processed in a laboratory operation 32. Result of the test is compared to a desired sphericity and/or roundness as indicated by operation 34. The required sphericity value x is between 0.75 and 0.90. As indicated by operation or step 36, if the tested particles do not meet the desired particle sphericity, a signal is sent through line 36a to device 36b for the purpose of repeating operation 20. Then network 30 is again used until the moist mass is tested and found to exceed the desired sphericity and/or roundness x indicated by operation 38. When that event occurs, a signal in line 38a indicates that operation 20 is completed. The final product is then dumped so the processed mass of particles or final product is conveyed through line 40 to a buffer silo 60. The mass or final product of properly shaped particles is retained in buffer silo 60 to allow metered feeding through line 62. As an alternative, operation 20 is stopped by timer 50 which is merely set to a desired processing time. This is the normal scheme and in practice the set process time is about 12 hours. After the processing time has expired, operation 20 dumps the processed mass of particles through line 40 into buffer silo 60. The silo is needed to convert the batch processing of the semi-dry feedstock into a continuous operation for hydrosizer 70. The silo is a surge tank used as a process accumulator for successive batches of processed feedstock. Timer 50 and network 30 can be used together. For instance, after the timer has expired, network 30 can determine whether the desired sphericity and/or roundness has been reached. But normally, the timer is merely set for a desired processing time. After the set processing time, the final product from operation 20 is dumped through line 40 into the buffer silo. At the set time, the final processed mass or product is metered from buffer silo 60 into a hydrosizer 70 where unwanted small particles are removed so the larger round particles are dried and cooled in drier 80. This method produces a final product for storage in bin or hopper 90. The final product can be subsequently graded. However, in accordance with the preferred embodiment, the final product from drier 80 is directed to a screening network 100 as shown in FIG. 2. Network 100 removes large particles, as indicated by block 102 and small particles as indicated by block 104 to deposit a selected grade of frac sand in receptacle 110 for shipment to the desired customer. The customer determines the grade of frac sand. Frac sand from drier 80 can be used to make a variety of different graded values for frac sands as required by the ultimate consumer. Method 10 thus converts mined silica sand into a desired frac sand.

Method 10 produces a final product as the contents of hopper 90 or, preferably, as a graded frac sand collected in receptor 110. After the batch abrasive attrition operation 20 processes the incoming feedstock, converted final product can be used as frac sand which is like naturally occurring frac sand from limited areas of the world. Various gas and oil mines require different size frac sand; consequently, the final product is a graded frac sand. An aspect of the invention is therefore grading of the frac sand by screening network 100, schematically illustrated in FIG. 2. Processed particles from drier and cooler 80 are passed through a standard screening network. In practice, the network includes a number of vertically spaced screens or sieves that are reduced in mesh size progressively. In this manner a desired product is selected from the mass processed by operation 20. As an overview, the sieve network or screen network incorporates an upper screen having a maximum size screen 120 for receiving particles from drier 80. These particles have a roundness and/or sphericity greater than about 0.7 or 0.75 but are of variable sizes, such as schematically illustrated by particles a, b, c and d of declining particle sizes. Screen 120 removes from the particle mass particles greater than a size determined by the mesh of the screen. In practice, this maximum particle size is in the general range of 6-35 mesh. This removes the larger particles represented by particle a. The remainder of the particles drop through various screens until they reach a minimum screen 122. This screen allows small particles d to pass through any subsequent screen of network 100 into a lower receptacle pan 124. Thus, as schematically illustrated, particles b and c are separated between maximum screen 120 and minimum screen 122. The remainder of the particles represented by particles d are deposited into pan 124. The final product having the desired grade is separated from between the two sizing screens of network 100 as indicated by receptacle or hopper 110. The size of the minimum screen 122 is in the range of 30-140 mesh. One common grade for frac sand is 16/30. In network 100 for this grade, there are several screens with a mesh size of 12, 16, 18, 20, 25, 30 and 40. The maximum screen size 120 is 16 mesh and the minimum screen size 122 is 30 mesh. Thus, screens between the maximum screen 120 and the minimum screen 122 have mesh size of 18, 20, 25 and 30. The frac sand grades generally extend between 6/12 and 70/140. The particular grade being desired may be used to determine the crushing and grinding of the feedstock in processing operation 14 of method 10 shown in FIG. 1. The desired or selected grade for method 10 is 18/20, the crushing and sizing operation of process 14 is less than the sizing operation if the desired or selected grade is 40/70. Consequently, the invention involves the increase of sphericity and/or roundness of the particles in the feedstock from process 14; however, this process can be controlled to generate a feedstock which is best suited for the desired or selected grade of the screening network 100. This is an alternate procedure not a part of the basic aspect of the invention. Often, only natural grain size of the mined silica sand is merely cleaned and used.

In practice, the selected grade for the frac sand has a maximum particle size of a little over 1.0 mm and a minimum size of about 0.5 mm. Thus, the frac sand is a mass of particles which are fairly large so they can allow a high permeability when the frac sand is in a proppant pack PP, as schematically shown in FIG. 3. The mass of frac sand of pack PP are forced into a fissure where the pack keeps the fissure open when there is a high pressure in a vertical direction against the proppant. This high pressure attempts to close the fissure and can approach several thousand psi. The proppant particles of pack PP have a high roundness and a high sphericity so high pressure on the fissure of an oil or gas well holds the fissure open and does not prevent passage of gas and oil through the fissure. There is a permeability of at least 25 Darcy at 6,000 psi due to the individual roundness of the particles. Thus the oil and gas can be extracted when it would be otherwise unclaimable. As shown in FIG. 3, the selected grade of the frac sand includes particles schematically illustrated in FIG. 2 as particle c, b. These particles retain their roundness when high pressure is applied as by the two sets of vertical arrows in FIG. 3. The desired grade has been explained and has a maximum size of 6-30 mesh and a minimum size of 30-140 mesh.

Referring now to FIG. 4, method 10 of FIG. 1 is performed by system 200 wherein the abrasive attrition operation 20 of method 10 is illustrated schematically as device 202. This device is shown in detail in FIGS. 5, 6 and 7. In accordance with the preferred embodiment of the system, drier 80 is a fluid bed drier and cooler which has an output directed to magnetic separation device 204 to remove magnetic particles 206 from the processed particles or final product deposited in silo or hopper 90 or screened by network 100.

Abrasive Attrition Device 202

In accordance with the invention, abrasive attrition device 202 is employed to perform operation 20 of method 10. As shown in FIGS. 5-7, abrasive attrition device 202 includes a support frame 300 on floor 302. The frame has a lower portion 304 and an upper fixed, extending arm 306. This support frame rotatably mounts container 310 having a cylindrical wall 312 and a lower circular wall 314. Upper circular edge or lip 316 of container 310 rotates in circular groove 322 of fixed lid or cover 320 mounted on arm 306. Fixed lid 320 has an opening 324 with a door 326 allowing batch loading of feedstock FS into container 310. The container is rotatably mounted on bearing 330 that is inclined on frame 300 so container 310 is rotatably mounted about a first axis x inclined to the right as shown in FIGS. 5, 6 and 7. Container 310 is driven about axis x by mechanism 340 including wheel 342 drivingly associated with container 310 and rotated by a motor 344. First axis x is concentric with bearing 330 and is orthogonal to the bearings so this first axis defines the rotation of container 310. To dump finished product FP from container 310, there is a lower dump opening 350 concentric with axis x and closed by door 352 pivoted on trunnion 354 supported on fixed arm 308. Door 352 is opened and closed by drive cylinder 356. Within cylinder 310 is a rotor 400 carried by shaft 402 concentric with the second axis y that is parallel to the first axis x. Thus, both axes are inclined in a direction from first axis x to second axis y, as shown in FIGS. 5 and 6. The bottom of rotor 400 is spaced slightly above bottom wall 314 and includes vertically spaced sets of axially extending beater blades 410, 412 and 414 which blades of each set are offset circumferentially, as best shown in FIG. 7. Each beater blade set includes preferably at least two diametrically opposed blades. However, more than two blades can be used in a set practicing the present invention. Motor 420 drives rotor 400 rotatably mounted on arm 306 and with respect to fixed lid 320. Adjacent lower or bottom wall 314 is an arcuate deflector 430 fixed on lid 320 by a vertically extending support bar 432 which has a very small profile so that it does not interfere with the feedstock in container 310 as the container is rotating about axis x. Deflector 430 surrounds lower beater blades of set 410 as shown in FIG. 7 so that rotation of container 310 in the direction of arrow m causes the lower portion of the feedstock mass to be directed into the oppositely rotating beater blades of lower set 410. With a small end 434 and scraper edge 436, deflector 430 forces the particles adjacent bottom wall 314 into the action diameter of the blades in lower set 410. Motor 420 drives rotor 400 so that the outer tip of the beater blades exceeds about 20 meters per second and act against the compressed feedstock in the lower portion of rotating container 310. As shown in FIGS. 5 and 6, the blade sets are mounted on cylindrical support member 402 with a vertical most end 404. This member is in the lower portion of the container so that as the container is filled with at least about 70% of feedstock FS, the beater blades act against the compressed feedstock in rotating container 310. In practice, conveyor 430 dumps processed feedstock FS into container 310 through opened door 326 as shown in FIG. 5. Container 310 is then rotated in direction m while beater blades on rotor 400 rotate in the opposite direction n. Deflector 430 maintains particles at the lower or bottom wall 314 moving more than the other particles. Particles are removed from wall 314 and deflected into the rotor blades of set 410. After the processed time of method 10 has expired, rotation of the container and rotor is stopped and cylinder 356 dumps the final processed mass or final product FP for subsequent removal of small particles and drying preparatory to grading, as indicated in the discussion relating to FIG. 2. By inclining container 310 in the direction between first axis x and small axis y, the feedstock is compressed in container 310 by gravitational force. The weight of the feedstock occupying at least 70% of the volume of container 210 also enhances the compression in the lower part of the container that is interacted with the rotating beater blades below end 404 of member 402. It has been found that abrasive attrition device 202 can be operated at high speed and for time to effect the conversion of silica sand into frac sand as explained herein.

Figure 8:
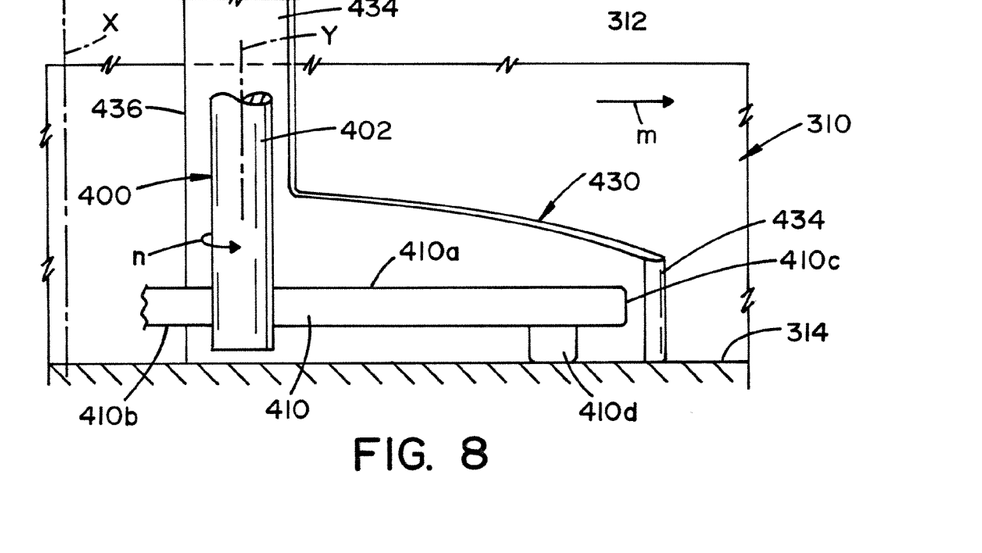
FIG. 8 is a schematic side view illustrating the lower portion of the abrasive attrition device used in the preferred embodiment of the present invention.

FIG. 8 illustrates the general structure and function of arcuate deflector 430 The deflector forces particles of feedstock into the area of the lowest most set 410 of beater blades illustrated as two axially extending blades 410a and 410b with outer tips 410c and optional lower spacers 410d. As container 410 rotates in direction m about axis x, rotor 400 rotates in an opposite direction n around offset axis y. Deflector 430 deflects material adjacent bottom wall 314 into the oppositely rotating beater blades 410a, 410b. Indeed, more than two beater blades may be employed. By using an inclined rotating container, the feedstock is tumbled and forced into the path of the oppositely rotating rotor 400. Deflector 430 removes material from the inner surface 312 and deflects it into the rotating rotor. High speed operation of the rotor provides intensive abrading action and homogenization. The bottom beater blades prevent build up of the material on the lower wall 314. This action is enhanced by increasing the rotational speed of the rotor blade to have a speed at tip 410c in the circle defined by the action of this tip of at least 20 meters per second. Surface 416 of the support bar 432 removes material from the inner surface of rotating container wall 312. This disclosure explains the general operation at the lowermost portion of the tilted or inclined rotating container.

Surface Treatment of Feedstock Particles

Figure 8A:
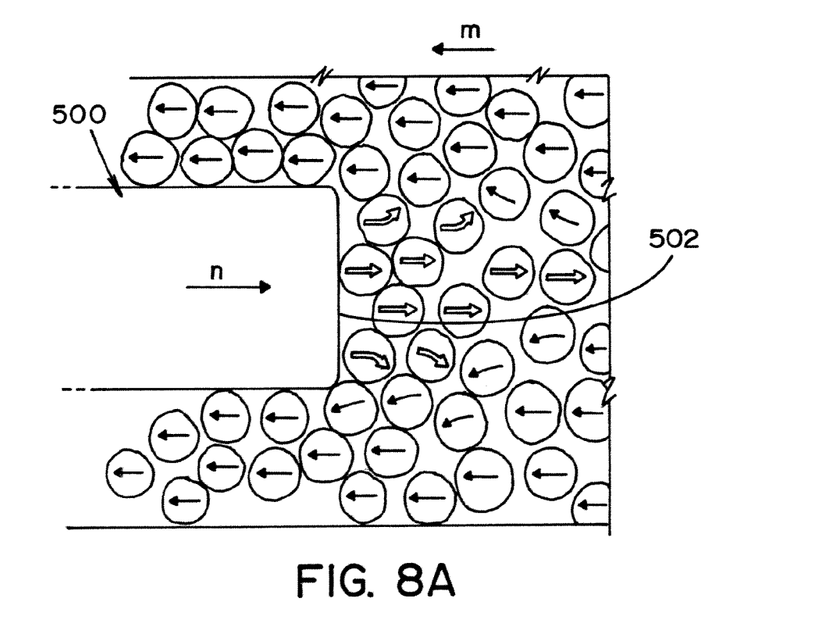
FIGS. 8A, 8B and 8C are schematic representations explaining certain aspects of the method and system using abrasive attrition to increase the sphericity and roundness of individual particles of a silica sand feedstock.
Figure 8B:
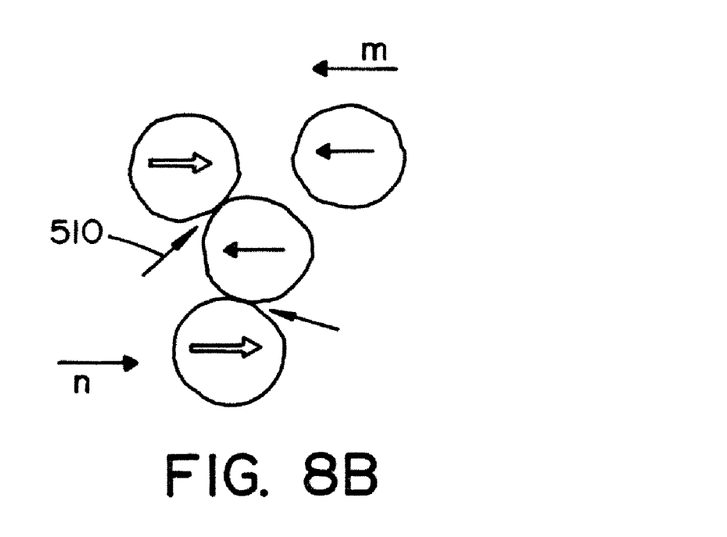
Figure 8C:
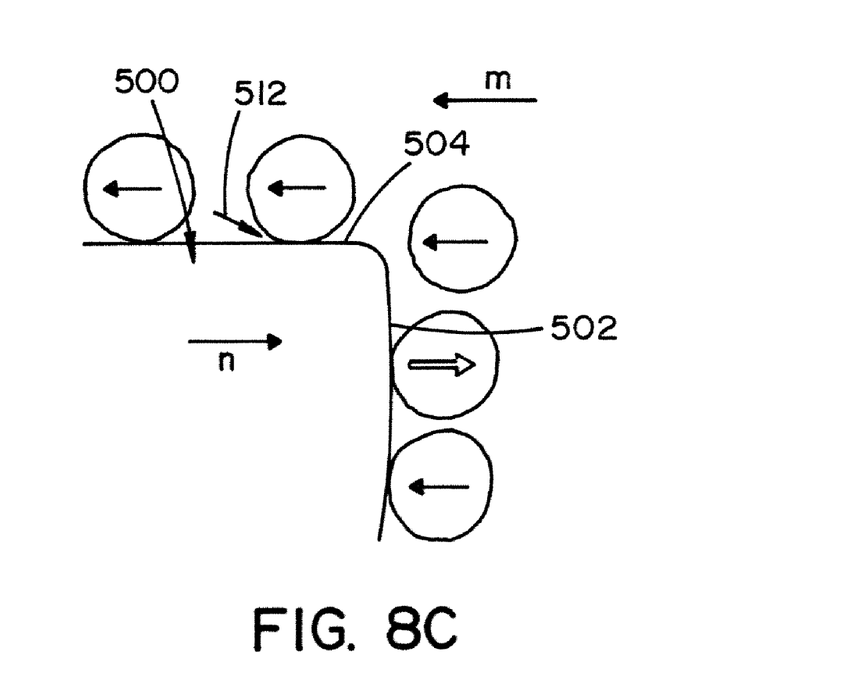

FIGS. 8A, 8B and 8C illustrate schematically the abrasive action of individual particles in the feedstock to abrade the surfaces of the particles. This action converts particle into the sphericity and roundness of frac sand. The individual particles are moved in opposite directions as illustrated by the solid arrows (direction m) and open arrows (direction n). As a beater blade 500 moves in direction n the feedstock particles are forced by container 310 in direction m. This action causes the side 502 of beater blades 500 to force some particles in direction n while the other particles are moving in direction m. Movement of particles in opposite, colliding directions causes abrasion between moving particles schematically indicated by arrow 510 in FIG. 8B. Movement of the particles in opposite directions by the interaction of the beater blades adjacent the lower portion of rotating container 310 affects the abrasive attrition of the particles. As beater blade 500 moves in direction n through particles moving in direction m, the abrasive action between the particles as illustrated in FIG. 8A and FIG. 8B is augmented by the action illustrated schematically in FIG. 8C. In this figure, particles moving in direction m engage edge 502 and move abrasively along surface 504. Thus, there is an abrasive action represented by arrow 512 between the surfaces of a moving beater blade as it engages the surfaces of particles moving in direction m. This interaction occurs at the lower portion of the tilted container where the particles are compressed together to enhance the abrasive action between the moving particles and between the beater blade surfaces and the particles moving in the opposite direction. These abrasive actions by device 202 causes increased sphericity and roundness of the particles being processed by the rotating container and oppositely rotating beater blades.

Figure 9:
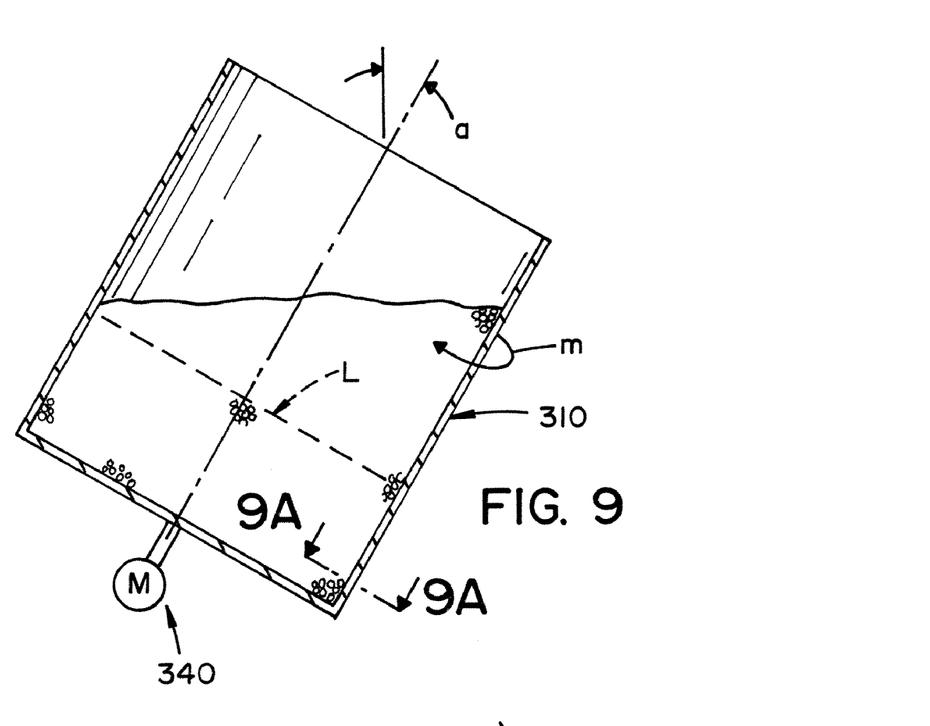
FIG. 9 is a schematic representation of the inclined container used in the method and system of the present invention illustrating the compacting action caused by filling the tilted container to a capacity which is greater than about 70% by volume.
Figure 9A:
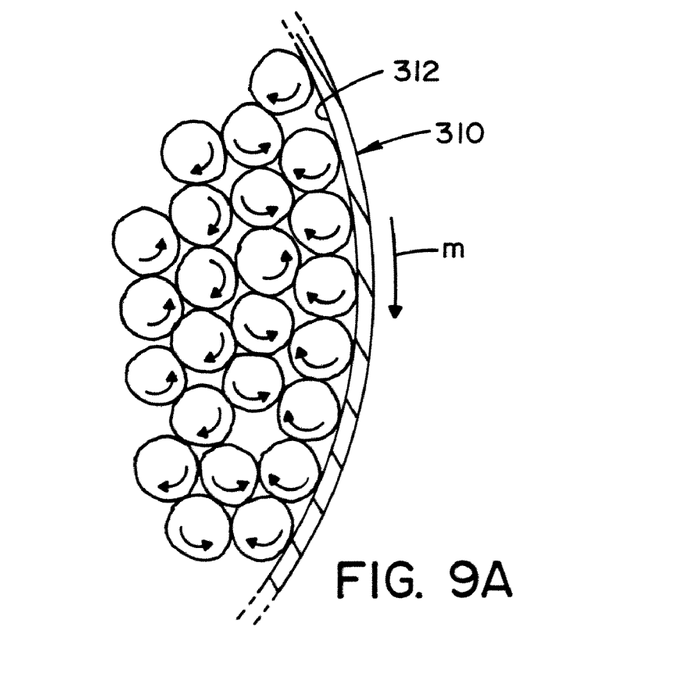
FIG. 9A is a partial view taken generally along line 9A-9A of FIG. 9 schematically illustrating the tumbling action caused by tilting the container, which tumbling action enhances the operation of the abrasive attrition device shown in FIGS. 5 and 6.
Figure 10:
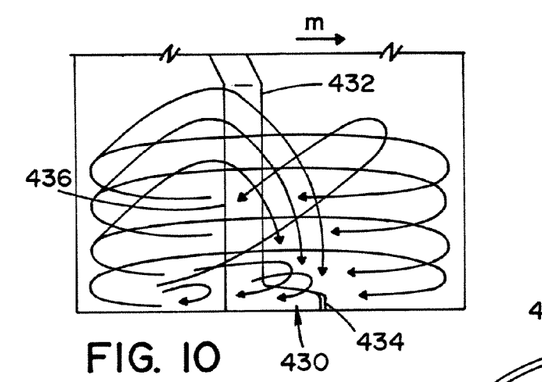
FIG. 10 is a side elevational view illustrating the movement of the particles caused by operation of the abrasive attrition device or mechanism used in the present invention; and, FIG. 11 is a top view schematically illustrating the movement of the particles in the abrasive attrition device or mechanism of the present invention.
Figure 11:
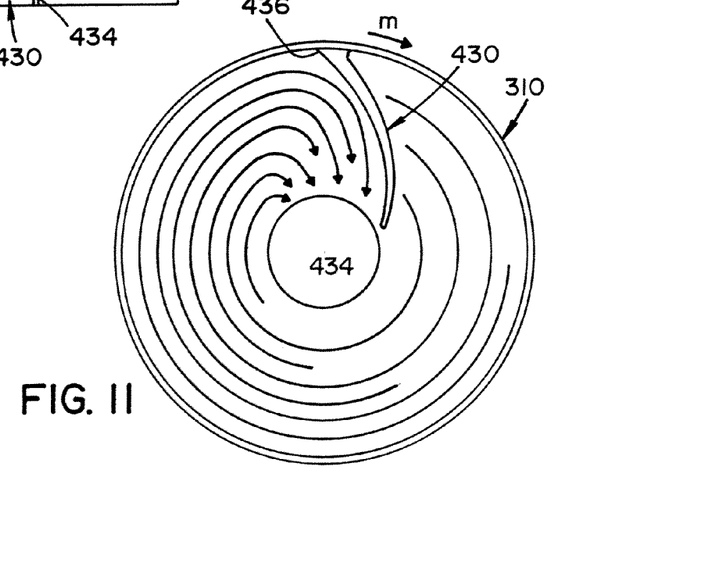

The abrasive action is enhanced by loading inclined container 310 with at least 70% feedstock FS as illustrated in FIG. 9. Since the container is rotated at inclined angle a, which angle is generally about 60°, the particles in the lower portion of container 310 below about line L of FIG. 9 are highly compressed. Line L represents generally the upper part of the beater blade support member 402 of rotor 400. Thus, the particles within the area below level L are subject to the action of the beater blades as well as to a tumbling abrasive action caused by rotation of container 310 tumbling the highly compressed particles adjacent the lower portion of the container. This concept is schematically illustrated in FIG. 9A. The showings in FIGS. 8A, 8B, 8C, 9 and 9A are not to scale in that they are used only for the purposes of the theoretical abrasive action caused by device 202 as the device operates on the tumbling feedstock particles loaded into its container. The particles are moved along the paths indicated by the arrows in FIGS. 10 and 11 illustrating the side view and top view, respectively, of how the particles are moved by the rotating cylindrical container 310. These paths are intercepted by the beater blades as so far described. Such interaction of the propelled movement of particles causes the surface action between particles and thus the increased roundness created in the silica sand particles processed by device 202, which is the preferred mechanism for operation 200 in method 10 of FIG. 1.

SUMMARY OF INVENTION

The preferred embodiment of the present invention relates to a method and system of converting somewhat ordinary naturally occurring silica sand having a roundness and/or sphericity as low as about 0.40 into a frac sand having a roundness and sphericity of greater than 0.60 and preferably greater than 0.70. This somewhat common, naturally occurring sand has a mined particle shape classified as "round" to "angular". In other words, the sand to be converted does not have a high degree of roundness or sphericity and may not have the crush resistance or strength necessary for use as frac sand. The invention involves a method of converting such naturally occurring sand into an acceptable frac sand having a selected grade. The invention has been determined to be more universal in its application and/or in the hard minerals used as a particle feedstock.

The primary aspect of the invention is the discovery of a method and system of making frac sand having a selected grade from naturally mined silica sand having a measured value of roundness and/or sphericity substantially less than 0.60. This discovered method and system involves processing the mined silica sand into a semi-dry feedstock with particles having a roundness and sphericity not much greater than the measured values and subjecting the feedstock particles to "abrasive attrition" by propelling the particles back in a compressed mass by a rotor blade through the path of the particles moving toward the rotor blade. The particles are moved in two opposite paths which are counteracting and interacting to abrade the particles. The rotor blade or beater blades also collides with the moving particles to help increase their sphericity. This physical bombardment between the particles moving in the opposite directions through a mass of particles is the abrasive attrition of the present invention. There is no particle fracturing, but only abrasive wearing to make the particles more spherical. The machine or device 202 used for propelling particles in opposite directions to cause interaction of the particles is a unique function of a "mixer" now used for performing this novel operation on silica sand. The invention converts preprocessed feedstock particles into acceptable frac sand by the method shown in FIG. 1 and the system shown in FIG. 4. The frac sand is graded and can be tested for crush resistance or strength and for its value of roundness and sphericity. The claims are hereinafter incorporated by reference as statement of summary of the discovery and its diverse aspects. The device shown in FIGS. 4-8 has heretofore been used for mixing and/or blending of a slurry in a continuous process of successive units.

To perform the crush test, the processed frac sand is crushed by a selected pressure, such as 6,000 psi. Then the percentage of fines that pass through the lower screen of a dual grading screen system is measured. If the grade is 16-30, then the amount of fines passing through a 30 mesh screen after the processed frac sand has been crushed by 6,000 psi must be less than 10% for that particular grade to be acceptable for a frac sand. Thus, the crush test of the frac sand is a specification defining the crushing pressure of the frac sand for the selected grade of the frac sand. The invention produces a sand approaching the characteristics of natural occurring frac sand as used for oil or gas wells. The frac sand is used to fill the fissures caused by the well being subject to an explosive charge. After the explosion, the frac sand is pumped into the fissures caused by the explosion at extremely high pressure to maintain the fissures open for the extraction of heretofore somewhat unavailable oil or gas. Since there is a high pressure involved, the frac sand must have acceptable crush resistance or strength, as previously defined, which specification or test involves less than 10% fines passing through the minimum screen of the selected frac sand grade. The normal feedstock for practicing the invention is naturally occurring mined silica sand having a $CiO_2$ greater than 80%. The sand is "round" to "angular." These are the individual particle shapes and they are found in naturally occurring sand. The feedstock has a very low roundness and sphericity. Such silica sand cannot be used as frac sand. In practice, the starting sand has a maximum grain size of substantially less than 8.0 mm. Indeed, the incoming feedstock from the mine is between 20 microns and about 6.0-8.0 mm. It has been found that other hard materials can be mined and crushed or otherwise formed into feedstock for processing by the invention. The processing results in an acceptable proppant. The hardness of the mineral used for the feedstock can be broadly defined on the Mohs scale as at least 6.

As indicated in FIG. 1, the mined mineral may be crushed, scrubbed and washed by any combinations of these operations to provide a semi-dry feedstock with the desired starting sized particles. This procedure is used to convert the mined sand into the particulate semi-dry feedstock that is loaded into the device that performs abrasive attrition to change the shape of the particle, not for merely removing impurities. Since the washing creates a wet process the incoming feedstock is wet screened and then introduced as a particle mass referred to as "feedstock." This feedstock FS is used in the method of the present invention for converting the mined sand into an acceptable, selected grade frac sand. Most of the incoming feedstock is annular silica product or oversized silica. As indicated in this specification, the process and system defined in the claims has been performed and can be duplicated using the data and information presented herein by any person skilled in the art of processing sand. Furthermore, the process used to produce the frac sand can be used to produce proppants from other hard material. Indeed, the novel process can be used to treat ceramic particles to improve their physical characteristics for ultimate use as a proppant.

The invention was a discovery of making frac sand, a proppant heretofore only available from a limited number of mined sources. It has been found that the invention can use various abrasive attrition devices to produce acceptable proppants. Abrasive attrition to make frac sand from common silica sand has never been done. The discovery of using abrasive attrition to improve the sphericity of silica sand is novel. Its application to produce a proppant with sphericity of over about 0.75, is the inventive discovery of the invention.

In accordance with the invention, the feedstock has a roundness and sphericity as low as about 0.40 and the processed feedstock or product has a roundness and sphericity of at least 0.60; but, preferably over about 0.70 to 0.75. The natural particles from the mining operation is often used; however, in some instances the mined mineral is processed into particles with a given particle size range. As a feature of the novel process, water is added to the feedstock, as shown in FIGS. 1 and 4. Water amounting to 5-15 percent of the mixture of feedstock and water is used to convert the abrasive attrition procedure into a semi-dry process instead of a dry process or a wet slurry process. Container 310 rotates in one direction with the wet feedstock compressed by its own weight caused by filling the container to about 70-90 percent. The weight of the load is as high as 500 kgr. Beater blades of vertically spaced sets 410, 412 and 414 are rotated through the compressed particle mass to drive particles back into the compressed mass of approaching feedstock. The particle to particle interaction removes the sharper edges and make the individual particles more spherical. The blades also interact with particles to smooth the surfaces of the particles. The container is inclined as shown in FIGS. 5, 6 and 9, to force the particles into tighter friction grinding action as shown in FIG. 9A. To perform this abrasive attrition to affect the shape of the particles, the rotor blades are rotated at a linear tip speed of over 20 meters per second, and preferably about 30 meters per second for the blade tip speed. This is at least about twice the prior speed of the rotor for prior use of the abrasive attrition device. At this very high speed, the beater blade cuts through the compressed particle mass of the lower portion of the feedstock loaded in the rotating container or carrier to cause abrasive attrition in a manner to increase the roundness and sphericity of the silica sand particles.

The desired roundness and sphericity is in the range of 0.60 to over 0.90. But, a critical characteristic is the crush test result. For larger frac sand, the crush strength is at least about 2 k psi. Smaller grades require higher crush strength, such as over about 4 k psi to 5 k psi. As a defining strength the frac sand of the invention has its roundness and sphericity increased to result in a crush strength of over about 3 k psi.

The roundness is important for the large particle forming proppants having preferred grades with a maximum value of 6-35 mesh and a minimum value of 30-140 mesh.

The invention involves a novel method and system for producing frac sand from silica sand using an high speed abrasive attrition device operating on semi-dry feedstock; however, the particular device explained and the operation of the device are not intended to be limiting in nature but illustrative of the present invention as defined in the appended claims.

Having thus defined the invention, the following is claimed:

1. A method of making a spherical proppant having a selected grade from a naturally occurring mined mineral having a hardness of over 6.0 Mohs, said method comprising:
   (a) preprocessing said mineral mechanically into a semi-dry feedstock comprising a mass of particles with initial sphericity values generally less than 0.60;
   (b) subjecting said feedstock to abrasive attrition for a process time; and,
   (c) controlling said process time to a value wherein said particles of said feedstock are converted to processed particles having a sphericity greater than 0.60 by increasing the sphericity of said feedstock particles by at least 0.10.

2. The method of claim 1 further including:
   (d) washing said processed particles to remove fines;
   (e) drying said processed particles; and,
   (f) screening said processed particles to obtain a proppant having said selected grade.

3. The method as defined in claim 2 wherein said controlled selected time is greater than about 12 hours.

4. The method as defined in claim 3 further including:
   (g) measuring the sphericity of said process particles after a first controlled time; and,
   (h) converting said first controlled time to the process time if said measured sphericity exceeds a given value.

5. The method as defined in claim 4 where said given value is in the range of 0.75 to 0.90.

6. The method as defined in claim 2 further including:
   (g) controlling the preprocessing operation by the size of said selected grade.

7. The method as defined in claim 1 wherein said controlled selected time is greater than about 12 hours.

8. The method as defined in claim 7 further including:
   (d) measuring the sphericity of said process particles after a first controlled time; and,
   (e) converting said first controlled time to the process time if said measured sphericity exceeds a given value.

9. The method as defined in claim 8 where said given value is in the range of 0.75 to 0.90.

10. The method of claim 1 wherein said mineral is silica sand and said proppant is frac sand.

11. The method as defined in claim 10 wherein at least 99% of said processed particles have a sphericity in the range of 0.75 to 0.90.

12. The method as defined in claim 10 wherein said selected grade is a grade with a maximum value of 6 to 35 mesh and a minimum value of 30-140 mesh.

13. A method as defined in claim 10 wherein said silica sand has a $SiO_2$ content of at least 80% and a general particle shape classified as between round and angular and a particle size of less than about 8.0 mm.

14. A method as defined in claim 10 wherein said preprocessed feedstock has a particle size coarser than about 350 mesh.

15. The method as defined in claim 1 wherein said feedstock is combined with water before being subjected to abrasive attrition.

16. The method as defined in claim 15 wherein said water is in the range of 5-20 percent by weight of said feedstock and water.

17. The method as defined in claim 1 wherein at least 99% of said processed particles have a sphericity in the range of 0.75 to 0.90.

18. The method as defined in claim 1 wherein said selected grade is a grade with a maximum value of 6 to 35 mesh and a minimum value of 30-140 mesh.

19. A method as defined in claim 1 wherein said preprocessed feedstock has a particle size coarser than about 350 mesh.

20. The method as defined in claim 1 wherein said semi-dry feedstock has at least 5 percent moisture content.

21. The method as defined in claim 1 wherein said semi-dry feedstock has less than 20 percent moisture content.

22. The method as defined in claim 1 further including conversion of said process from batch to continuous before said feedstock is washed.

* * * * *